(12) United States Patent
Yoon et al.

(10) Patent No.: US 11,063,813 B2
(45) Date of Patent: Jul. 13, 2021

(54) METHOD AND APPARATUS FOR CONFIGURATING TRANSMISSION MODE IN COPPER WIRE BASED NETWORK

(71) Applicant: KT CORPORATION, Gyeonggi-do (KR)

(72) Inventors: Kwangyeol Yoon, Seoul (KR); Jonghak Kim, Gyeonggi-do (KR); Nowook Park, Gyeonggi-do (KR); Hyung-Jin Park, Seoul (KR); Kyoung-Ju Lee, Seoul (KR); In-Taek Jeong, Daejeon (KR); Tae Woo Ha, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 126 days.

(21) Appl. No.: 16/309,996

(22) PCT Filed: Jun. 12, 2017

(86) PCT No.: PCT/KR2017/006099
§ 371 (c)(1),
(2) Date: Apr. 10, 2019

(87) PCT Pub. No.: WO2017/217721
PCT Pub. Date: Dec. 21, 2017

(65) Prior Publication Data
US 2019/0238392 A1    Aug. 1, 2019

(30) Foreign Application Priority Data

Jun. 14, 2016  (KR) .................. 10-2016-0074007

(51) Int. Cl.
*G06F 15/173*      (2006.01)
*H04L 12/24*       (2006.01)
(Continued)

(52) U.S. Cl.
CPC ........... *H04L 41/04* (2013.01); *H04B 7/0413* (2013.01); *H04B 17/336* (2015.01);
(Continued)

(58) Field of Classification Search
CPC ....... H04L 41/04; H04L 1/0083; H04L 12/64; H04L 12/6418; H04L 25/12;
(Continued)

(56) References Cited

U.S. PATENT DOCUMENTS

2003/0154272 A1   8/2003 Dillon et al.
2005/0232172 A1  10/2005 Ouyang et al.
(Continued)

FOREIGN PATENT DOCUMENTS

JP   2011-009964 A   1/2011
JP   2015-008349 A   1/2015
(Continued)

OTHER PUBLICATIONS

European Patent Office, European Search Report of corresponding EP Patent Application No. 17813545.5, dated Jan. 13, 2020.
(Continued)

*Primary Examiner* — Wing F Chan
*Assistant Examiner* — Joseph R Maniwang
(74) *Attorney, Agent, or Firm* — IP Legal Services, LLC (57) ABSTRACT

A method for configurating a transmission mode to provide an Internet service to a customer-premises equipment by an transmission mode configurating apparatus in an access network structure is provided. At least one network management equipment and at least one customer-premises equipment are connected through a bundle of cables including a plurality of transmission lines. The method includes determining the number of transmission lines connected to the customer-premises equipment; determining at least one of available transmission mode to provide depending on the
(Continued)

number of transmission lines; if a plurality of available transmission modes are determined, calculating a transmission performance in each of the available transmission modes; and selecting the transmission mode with the highest performance among the plurality of the available transmission modes.

13 Claims, 7 Drawing Sheets

(51) Int. Cl.
    *H04L 25/12*     (2006.01)
    *H04L 12/64*     (2006.01)
    *H04B 17/336*     (2015.01)
    *H04B 7/0413*     (2017.01)
    *H04L 1/00*     (2006.01)
    *H04L 27/26*     (2006.01)

(52) U.S. Cl.
    CPC ............ *H04L 1/0083* (2013.01); *H04L 12/64* (2013.01); *H04L 12/6418* (2013.01); *H04L 25/12* (2013.01); *H04L 27/2607* (2013.01); H04L 2012/6478 (2013.01)

(58) Field of Classification Search
    CPC ........ H04L 27/2607; H04L 2012/6478; H04B 17/336; H04B 7/0413
    USPC ....................................................... 709/223
    See application file for complete search history.

(56) References Cited

U.S. PATENT DOCUMENTS

| | | |
|---|---|---|
| 2007/0005749 A1 | 1/2007 | Sampath |
| 2010/0020726 A1 | 1/2010 | Chu et al. |
| 2010/0054144 A1 | 3/2010 | Choi et al. |
| 2010/0061473 A1 | 3/2010 | Choi et al. |
| 2013/0259101 A1 | 10/2013 | Earnshaw et al. |
| 2014/0056260 A1 | 2/2014 | Choi et al. |
| 2015/0172036 A1 | 6/2015 | Katar et al. |
| 2016/0028439 A1* | 1/2016 | Tahir ........................ H04B 3/54 375/257 |
| 2016/0197669 A1* | 7/2016 | Babich .................. H04W 28/20 370/315 |

FOREIGN PATENT DOCUMENTS

| | | |
|---|---|---|
| KR | 10-1998-0073728 A | 11/1998 |
| KR | 10-2009-0058494 A | 6/2009 |
| KR | 10-1057613 B1 | 8/2011 |
| KR | 10-2015-0002739 A | 1/2015 |
| KR | 10-2015-0072881 A | 6/2015 |

OTHER PUBLICATIONS

European Patent Office, Office Action of corresponding EP Patent Application No. 17813545.5, dated Dec. 10, 2020.

* cited by examiner

METHOD AND APPARATUS FOR CONFIGURATING TRANSMISSION MODE IN COPPER WIRE BASED NETWORK

CROSS REFERENCE TO RELATED APPLICATIONS

This application is a National Stage Patent Application of PCT International Patent Application No. PCT/KR2017/006099 (filed on Jun. 12, 2017) under 35 U.S.C. § 371, which claims priority to Korean Patent Application No. 10-2016-0074007 (filed on Jun. 14, 2016), the teachings of which are incorporated herein in their entireties by reference.

TECHNICAL FIELD

The present invention relates to a method and an apparatus for configurating transmission mode in copper wire based network.

BACKGROUND ART

As the Giga internet has becomes commercially available and widely used in recent years, network devices that provide internet services of 100 Mbps are being replaced by network devices that provide the giga internet service.

In high-density housing complexes such as apartments, condos, and townhouses, a network device is connected to a plurality of subscriber terminals through a bundle of cables by way of a main distribution frame (MDF) located in a building and leading to subscriber lines. In this case, a variety of internet services are provided depending on the internet package each subscriber is subscribed to and the type of subscriber line.

When it comes to providing communication service using a bundle of cables installed in a building, research is continuing to solve the problems of variations in transmission performance with end-to-end line characteristics, branch point length-dependent line characteristics, transmission power-dependent equipment characteristics, and the effect of interference from a combination of simultaneous users and to offer giga internet service with optimal performance.

DISCLOSURE

Technical Problem

The present invention has been made in an effort to provide a transmission mode configurating apparatus capable of providing high-speed internet service to a subscriber based on the characteristics of a transmission line laid between network management equipment and customer-premises equipment, and a transmission mode configurating method using the same.

Technical Solution

An exemplary embodiment provides a method for configurating a transmission mode to provide an Internet service to a customer-premises equipment by an transmission mode configurating apparatus in an access network structure. The at least one network management equipment and at least one customer-premises equipment are connected through a bundle of cables including a plurality of transmission lines. The method includes determining the number of transmission lines connected to the customer-premises equipment; determining at least one of available transmission mode to provide depending on the number of transmission lines; if a plurality of available transmission modes are determined, calculating a transmission performance in each of the available transmission modes; and selecting the transmission mode with the highest performance among the plurality of the available transmission modes.

The determining the number of lines may includes determining the number of transmission lines by sensing impedance changes or input signals in the transmission lines.

The determining the available transmission mode may include determining that the available transmission mode is a single-input and single-output (SISO) mode when a single transmission line is connected; and determining that the available transmission modes are the single-input and single-output (SISO) mode and a multiple-input and multiple-output (MIMO) mode when multiple transmission lines are connected.

The calculating the transmission performance may include detecting the maximum frequency of signals that can be transferred through the transmission lines; and detecting the characteristics of response signals transferred through the transmission lines.

The response signal characteristics may include at least one among frequency response characteristics and a signal-to-noise ratio (SNR).

The determining the available transmission mode may include calculating the transmission performance based on the number of subcarriers, the number of bits transmitted per symbol, a forward error correction (FEC) rate, and a subcarrier transmission frequency.

The subcarrier transmission frequency may be calculated by adding a guard band frequency to frequency information. The frequency information may be calculated using the number of subcarriers and the maximum frequency bandwidth.

Another exemplary embodiment provides a transmission mode configurating apparatus for changing transmission modes to provide interne service to customer-premises equipment. The transmission mode configurating apparatus includes a transmission matching section that detects response signal characteristics of transmission lines connected to the customer-premises equipment, the maximum frequency of signals that can be transferred through the transmission lines, and the number of the transmission lines; and a controller that determines at least one of available transmission mode to provide depending on the number of the transmission lines detected by the transmission matching section, and controls the transmission mode to operate in an optimal transmission mode which is selected by calculating the transmission performance in each of the available transmission modes.

The transmission matching section may determine the number of transmission lines by sensing impedance changes or input signals in the transmission lines.

The controller may determine that the available transmission mode is a single-input and single-output (SISO) mode when a single transmission line is connected. The controller may determine that the available transmission modes are the single-input and single-output (SISO) mode and a multiple-input and multiple-output (MIMO) mode when multiple transmission lines are connected.

The response signal characteristics may include at least one among frequency response characteristics and a signal-to-noise ratio (SNR).

The controller may calculate the transmission performance based on the number of subcarriers, the number of bits transmitted per symbol, forward error correction (FEC) rate, and a subcarrier transmission frequency.

The subcarrier transmission frequency may be calculated by adding a guard band frequency to frequency information. The frequency information may be calculated using the number of subcarriers and the maximum frequency bandwidth.

Yet another exemplary embodiment provides a transmission mode configurating apparatus for configurating a transmission mode for transmission lines connected to customer-premises equipment. The transmission mode configurating apparatus includes: a transmitter and receiver that transmits and receives signals to and from the customer-premises equipment; a memory storing a program for configurating a transmission mode depending on the transmission lines; and a processor that executes operations implemented on the program. The program includes instructions for detecting the number of transmission lines by sensing impedance changes or input signals in the lines; determining at least one of available transmission mode to provide depending on the number of transmission lines; and controlling the transmission mode to operate in an optimal transmission mode selected by calculating the transmission performance in each of the available transmission modes.

The program may include instructions for determining that the available transmission mode is a single-input and single-output (SISO) mode when the transmission line connected is a pair of wires; and determining that the available transmission modes are the single-input and single-output (SISO) mode and a multiple-input and multiple-output (MIMO) mode when the transmission lines connected are two or more pairs of wires.

The program may include instructions for calculating the transmission performance in each of the transmission modes by detecting the frequency response characteristics of signals applied through the transmission lines, the signal-to-noise ratio, and the maximum frequency of signals that can be transferred through the transmission lines.

The program may include instructions for calculating the transmission performance based on the number of subcarriers, the number of bits transmitted per symbol, a forward error correction (FEC) rate, and a subcarrier transmission frequency.

The subcarrier transmission frequency may be calculated by adding a guard band frequency to frequency information. The frequency information may be calculated using the number of subcarriers and the maximum frequency bandwidth.

Advantageous Effects

The method and the apparatus for configurating transmission mode according to the present invention may provide an environment for optimized high-speed internet service by selecting a data transmission mode depending on the number of transmission lines and the status of the transmission lines.

MODE FOR INVENTION

In the following detailed description, only certain exemplary embodiments have been shown and described, simply by way of illustration. As those skilled in the art would realize, the described embodiments may be modified in various different ways, all without departing from the spirit or scope. Accordingly, the drawings and description are to be regarded as illustrative in nature and not restrictive. Like reference numerals designate like elements throughout the specification Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Hereinafter, a transmission mode configurating apparatus for a copper wire-based network and a transmission mode configurating method using the same according to an exemplary embodiment will be described in detail with reference to the drawings.

Figure 1:
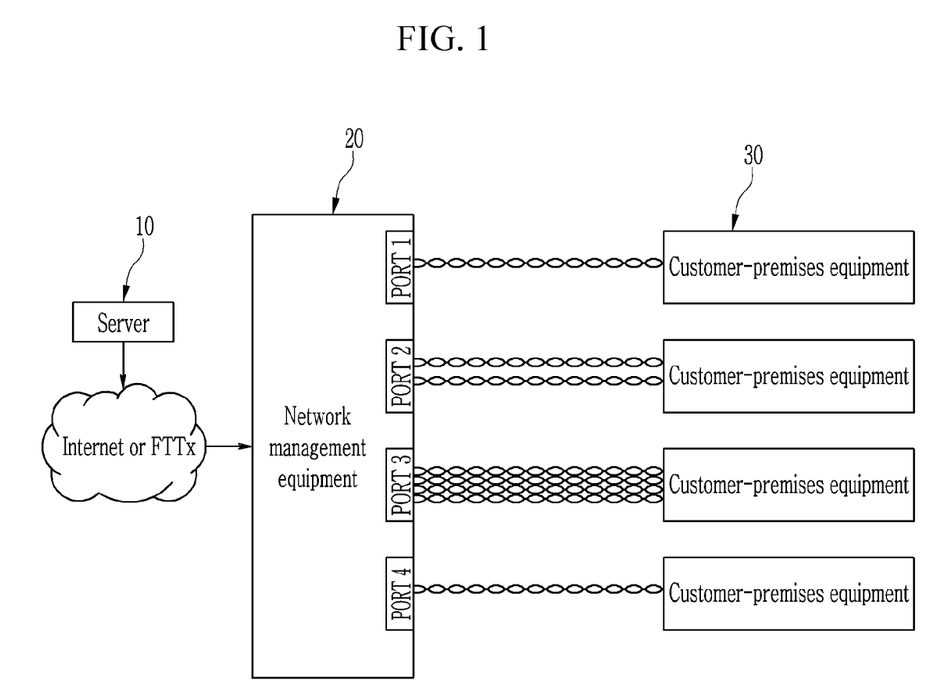
FIG. 1 is a diagram illustrating a structure of a copper wire network system according to an exemplary embodiment.

FIG. 1 is a diagram illustrating a structure of a copper wire network system according to an exemplary embodiment. The copper wire network system shown herein is a schematic configuration required to describe the exemplary embodiment, but is not limited to this configuration.

Referring to FIG. 1, the uplink side of network management equipment 20 is connected to a server 10 over a network, and the downlink side of the network management equipment 20 is connected to at least one piece of customer-premises equipment 30 through at least one cable.

The server 10 is connected to at least one service provider and the network management equipment 20, and implements internet service policies and network management on a number of pieces of customer-premises equipment 30 installed in an internet subscriber's home.

According to an exemplary embodiment, the network is a broadband network such as FTTx (Fiber To The x) including FTTH (Fiber To The Home), and may include an optical line terminal such as an OLT at the end.

Moreover, the cables on the downlink side may be a bundle of cables including at least one among UTP, phone lines, power lines, and coaxial cables.

The network management equipment 20, which is Master equipment (ME), is connected through a bundle of cables to customer-premises equipments (CPEs) 30 which is a subscriber terminal. The network management equipment 20 configures a
Giga internet network by connecting a plurality of modems using copper wires. The network management equipment 20 may be installed in a communications room in a building or a copper terminal box.

The network management equipment 20 according to an exemplary embodiment may provide speeds from 100 Mbps to 10 Gbps depending on the number of transmission lines (number of pairs of wires) of in-building cable connected to a subscriber. Although the network management equipment 20 according to an exemplary embodiment is illustrated as having one to four transmission lines and allowing for data transfer rates up to 10 Gbps by way of example, the number of transmission lines and the data transfer rates are not limited thereto and may vary depending on the environment where internet service is provided.

Referring to FIG. 1, the network management equipment 20 is basically connected to the customer-premises equipment 30 through a transmission line having a pair of two strands, and transmits data in a single-input and single-output (SISO) transmission mode. In order to provide faster speeds than those provided through one pair of wires, data may be transmitted to the customer-premises equipment 30 in a multiple-input and multiple-output (MIMO) mode through two pairs (four strands) or four pairs (eight strands) of wires.

When data is transmitted through multiple pairs of transmission lines, the transmission performance is generally higher in the multiple-input and multiple-output (MIMO) mode. However, the transmission performance may be higher in the single-input and single-output (SISO) mode due to effects from the transmission frequency bandwidth, transmission distance, line status such as line disconnection, and the surrounding environment.

The network management equipment 20 according to an exemplary embodiment includes a transmission mode configurating apparatus 100 that detects the number of transmission lines connected to the customer-premises equipment 30 and the status of the transmission lines, and provides internet service to the customer-premises equipment 30 by configuring a transmission mode suitable for the line characteristics and controlling parameters.

Figure 2:
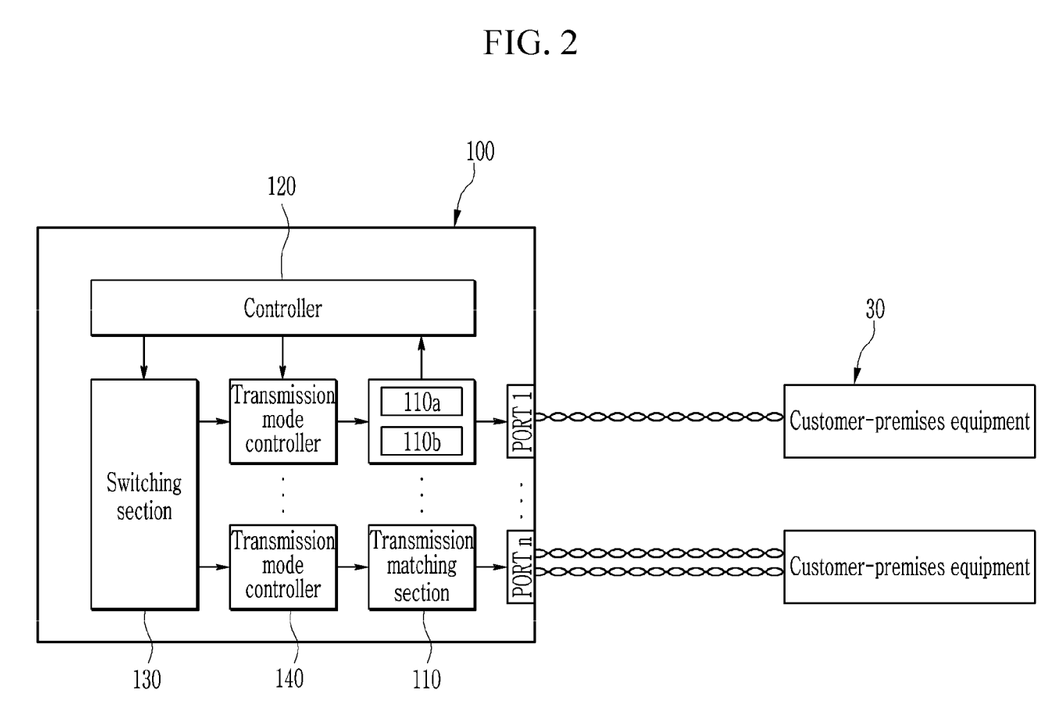
FIG. 2 is a diagram illustrating a structure of a transmission mode configurating apparatus according to an exemplary embodiment.

FIG. 2 is a diagram illustrating a structure of a transmission mode configurating apparatus according to an exemplary embodiment.

Referring to FIG. 2, a transmission mode configurating apparatus 100 according to an exemplary embodiment includes a transmission matching section 110, a controller 120, a switching section 130, and a transmission mode controller 140.

The transmission matching section 110 includes a signal detector 110a for detecting signals on transmission lines connected to customer-premises equipment 30, and a transmission line detector 110b for detecting the number of transmission lines.

The signal detector 110a detects the maximum frequency of signals that can be transferred through the transmission lines connected to the customer-premises equipment 30, and detects the characteristics of response signals by which the status of the lines can be checked. The status of the lines refers to the status of copper wires that can affect the quality of data provided to the customer-premises equipment 30, including the length of the transmission lines, disconnection of the transmission lines, and abnormal connection of the transmission lines. The response signal characteristics may include at least one between frequency response characteristics and signal-to-noise ratio (SNR).

The transmission line detector 110b detects the number of lines connected to the customer-premises equipment 30 by sensing impedance changes or input signals in the lines connected to the customer-premises equipment 30.

The controller 120 determines which signal transmission mode to provide depending on the number of transmission lines detected by the transmission matching section 110. If a plurality of signal transmission modes are available, the controller 120 sets the signal transmission mode of the network management equipment 20 by calculating the transmission performance in each transmission mode based on the maximum frequency information and response signal characteristics detected by the transmission matching section 110.

For example, if the transmission line detected by the transmission matching section 110 is a pair of wires, the controller 120 may determine to provide the SISO mode as the signal transmission mode. And if the transmission lines detected by the transmission matching section 110 are two or more pairs of wires, the controller 120 may determine to provide the SISO mode or the MIMO mode as the signal transmission mode.

In this case, the controller 120 may compare the transmission performance in the SISO mode and the transmission performance in the MIMO mode based on the maximum frequency information and response signal characteristics detected by the transmission matching section 110. If the transmission performance in the SISO mode is deemed better, the controller 120 may control the transmission mode to run the SISO mode. While if the transmission performance in the MIMO mode is deemed better, the controller 120 may control the transmission mode to run the MIMO mode.

The controller 120 calculates transmission performance, i.e., maximum transfer rate, based on the number of subcarriers, i.e., symbols, the number of bits transmitted per symbol, a forward error correction (FEC) rate, and a subcarrier transmission frequency.

That is, the maximum transfer rate may be calculated as in the following Equation 1.

$$\text{Transfer rate} = \text{number of subcarriers} \times \text{number of bits transmitted per symbol} \times \text{forward error correction rate} \times \text{subcarrier transmission frequency} \quad (1)$$

In this case, the subcarrier transmission frequency may be calculated by adding a guard band frequency to frequency information calculated using the number of subcarriers and the transmission frequency bandwidth. That is, the subcarrier transmission frequency may be calculated as in the following Equation 2.

$$\text{Subcarrier transmission frequency} = \text{number of subcarriers}/\text{transmission frequency bandwidth} + \text{guard band frequency} \quad (2)$$

In this case, the number of bits transmitted per symbol and the forward error correction rate may vary with the response signal characteristics, and the transmission frequency bandwidth and the number of subcarriers may vary depending on the transmission mode.

The switching section 130 switches data transferred over an external network interface, which is to be forwarded to each piece of customer-premises equipment 30, and passes the data to the transmission mode controller 140.

The transmission mode controller 140 receives transmission mode information from the controller 120, and allows data passed from the switching section 130 to be transmitted in a transmission mode suitable for the transmission lines connected to the customer-premises equipment 30.

The transmission mode configurating apparatus 100 according to an exemplary embodiment may monitor the number of transmission lines connecting the network management equipment 20 and the customer-premises equipment 30 in a copper wire-based network architecture. The transmission mode configurating apparatus 100 may detect a transmission mode it can provide, and configure an optimal transmission mode by calculating the transmission performance in each transmission mode.

Figure 3:
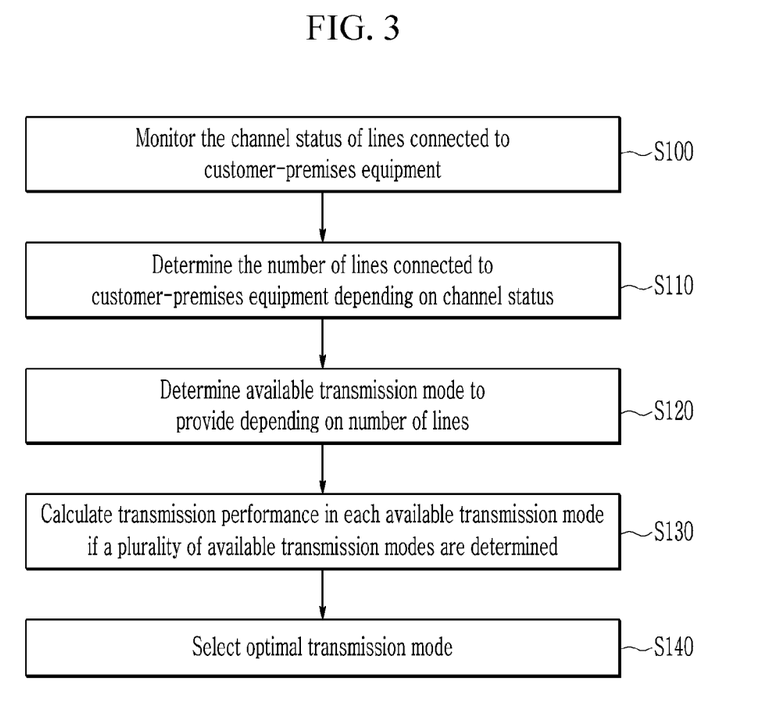
FIG. 3 is a flowchart illustrating a method for changing the transmission mode of a transmission mode configurating apparatus in a copper wire based network architecture according to an exemplary embodiment.

Referring to FIG. 3, a method for a transmission mode configurating apparatus 100 to change the transmission mode in a copper wire-based network architecture will be described in detail.

FIG. 3 is a flowchart illustrating a method for changing the transmission mode of a transmission mode configurating apparatus in a copper wire based network architecture according to an exemplary embodiment. The flowchart will be explained below by using the same reference numerals as for the components in FIGS. 1 and 2.

Referring to FIG. 3, the transmission mode configurating apparatus 100 according to an exemplary embodiment is installed within the network management equipment 20 of which its uplink side is connected to the server 10 and of which its downlink side is connected to the customer-premises equipment 30, and monitors the channel status of lines connected to the customer-premises equipment 30 (S100).

Then, the transmission mode configurating apparatus 100 determines the number of strands of transmission lines connected to the customer-premises equipment 30 based on the monitored channel status (S110). In this instance, the transmission mode configurating apparatus 100 may determine the number of strands of transmission lines by sensing impedance changes or input signals in the transmission lines.

Then, the transmission mode configurating apparatus 100 determines at least one of available transmission mode to provide depending on the number of transmission lines (S120). That is, if there is a single transmission line, the transmission mode configurating apparatus 100 may determine to provide the single-input and single-output (SISO) mode as the available transmission mode. If there are multiple transmission lines, the transmission mode configurating apparatus 100 may determine to provide the single-input and single-output (SISO) mode or the multiple-input and multiple-output (MIMO) mode as the available transmission modes. Also, the transmission mode configurating apparatus 100 detects the maximum frequency of signals that can be transferred through the transmission lines connected to the customer-premises equipment 30, and detects the characteristics of response signals.

The response signal characteristics are information by which the status of the transmission lines can be checked, for example, frequency response characteristics and signal-to-noise ratio (SNR) by which the status of the transmission lines can be checked, including the length of the transmission lines, disconnection of the transmission lines, and abnormal connection of the transmission lines.

If a plurality of the available transmission modes are determined, the transmission mode configurating apparatus 100 calculates the transmission performance in each available transmission mode (S130).

The transmission mode configurating apparatus 100 may calculate transmission performance, i.e., maximum transfer rate, based on the number of subcarriers, i.e., symbols, the number of bits transmitted per symbol, a forward error correction (FEC) rate, and a subcarrier transmission frequency.

In this case, the subcarrier transmission frequency may be calculated by adding a guard band frequency to frequency information calculated using the number of subcarriers and the transmission frequency bandwidth.

The number of bits transmitted per symbol and the forward error correction rate may vary with the response signal characteristics, and the transmission frequency bandwidth and the number of subcarriers may vary depending on the transmission mode.

The transmission mode configurating apparatus 100 selects the transmission mode with the highest performance among the plurality of available transmission modes (S140). That is, if there is a pair line connected between the network management equipment 20 and the customer-premises equipment 30, the transmission mode configurating apparatus 100 may select the SISO mode. If there are two or more pairs lines connected between them, the transmission mode configurating apparatus 100 may select the transmission mode with higher performance by comparing the transmission performance in the SISO mode and the transmission mode in the MIMO mode.

Figure 4:
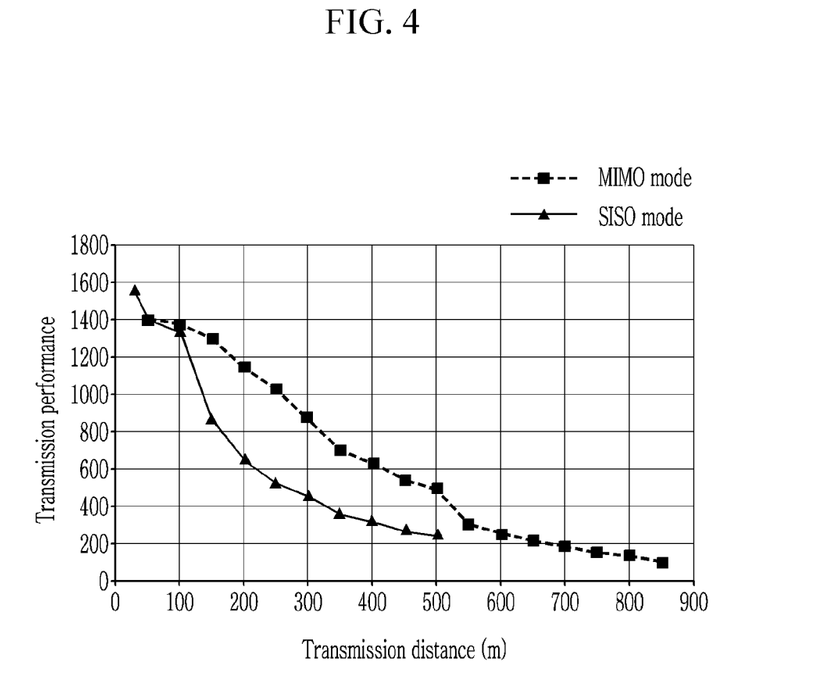
FIG. 4 is a diagram illustrating the transmission performance in each transmission mode with respect to transmission distance.
Figure 5:
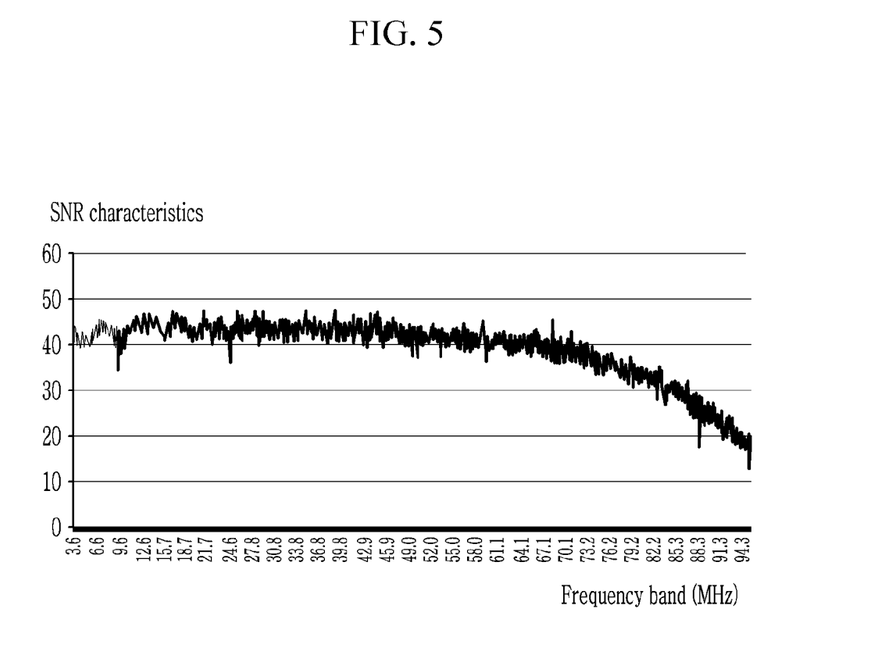
FIG. 5 is a diagram illustrating the signal-to-noise ratio (SNR) characteristics with respect to frequency band.

FIG. 4 is a diagram illustrating the transmission performance in each transmission mode with respect to transmission distance, and FIG. 5 is a diagram illustrating the signal-to-noise ratio (SNR) characteristics with respect to the frequency band.

Referring to FIG. 4, it can be seen that, in the case of multiple lines, the transmission performance generally tends to be better in the MIMO mode in which a plurality of pairs of copper wires are used than in the SISO mode in which a pair of copper wires are used. However, it can be seen that, if the transmission distance is short, the transmission performance in the SISO mode is better than the transmission performance in the MIMO mode.

Moreover, referring to FIG. 5, notably, the signal-to-noise ratio characteristics deteriorate in higher frequency bands, and therefore the amount of bits allocated per subcarrier decreases, thereby degrading the transmission performance.

Taking into account that domestic internet subscribers usually reside in apartments or condos, copper wires may have a transmission distance of up to 150 m, and high performance may be achieved in the SISO mode even if part of the bundle of cables between the network management equipment 20 and the customer-premises equipment 30 is connected by multiple lines due to effects from the line status and the surrounding environment.

The transmission mode configurating apparatus according to the present invention may provide optimized high-speed internet service by checking the status of transmission lines and the transmission distance depending on the number of transmission lines and the response characteristics of the transmission lines, and selecting a transmission mode suitable for the environment of the transmission lines.

Figure 6:
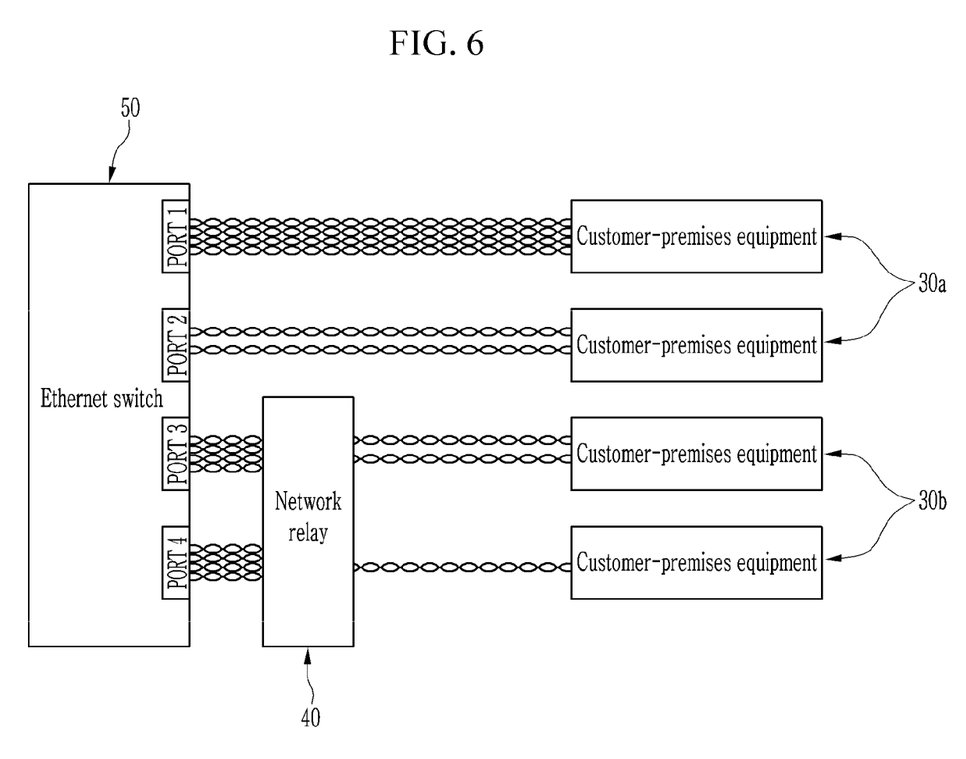
FIG. 6 is a diagram illustrating a structure of a copper wire network system according to another exemplary embodiment.

FIG. 6 is a diagram illustrating a structure of a copper wire network system according to another exemplary embodiment. Referring to FIG. 6, an Ethernet switch 50 receives data through an NNI (network-to-network interface) to forward it to subscribers. Also, the Ethernet switch 50 may provide data directly to customer-premises equipment 30a without a network relay 40 or pass data to the network relay 40 through internal switching. The network relay 40 may convert data in a way suitable for customer-premises equipment 30b and a given data transfer rate, and send the data to the corresponding ports.

In this case, the network relay 40 may be connected to the Ethernet switch 50 by four pairs of transmission lines and connected to the customer-premises equipment 30 by two pairs of transmission lines or one pair of transmission line.

That is, the network relay 40 receives data from the Ethernet switch 50, converts the data in a way suitable for the characteristics of transmission lines connected to the customer-premises equipment 30b, and provides it.

In this case, the network relay 40 may provide a network service with high transfer rates to the customer-premises equipment 30b even with a few transmission lines by converting data received from the Ethernet switch 40 according to the characteristics of the transmission lines.

The network relay 40 according to the present exemplary embodiment includes a transmission mode configurating apparatus that checks the number of transmission lines connected to the customer-premises equipment 30b and the status of the transmission lines, and provides internet service to the customer-premises equipment 30b by configurating a transmission mode suitable for the line characteristics and controlling parameters.

Figure 7:
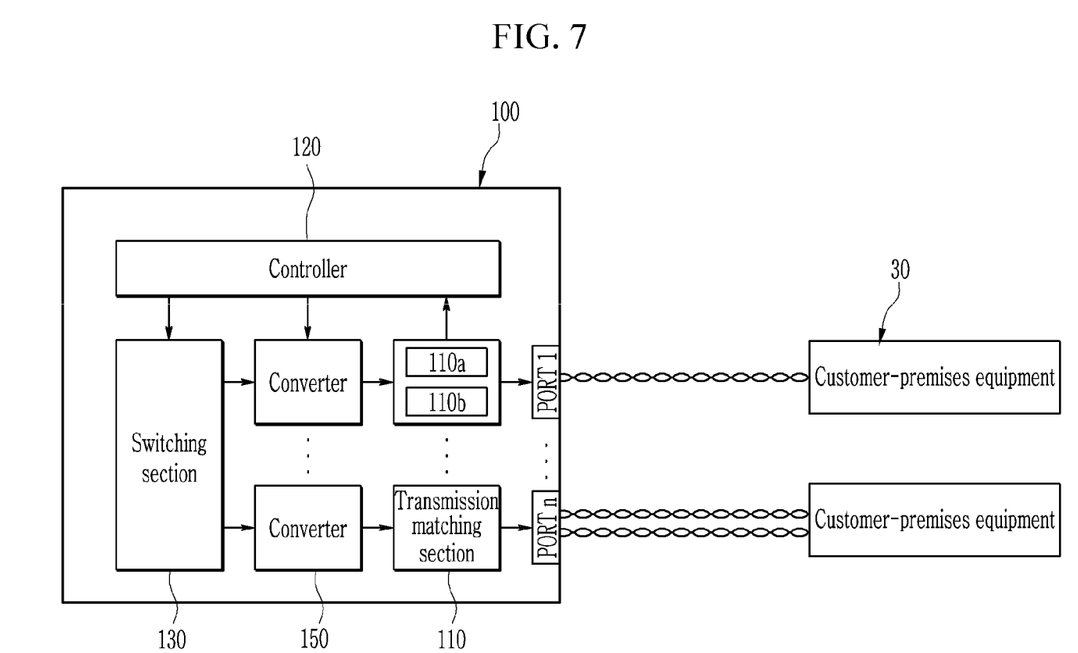
FIG. 7 is a diagram illustrating a structure of a transmission mode configurating apparatus according to another exemplary embodiment.

FIG. 7 is a diagram illustrating a structure of a transmission mode configurating apparatus according to another exemplary embodiment.

Referring to FIG. 7, a transmission mode configurating apparatus 100 according to another exemplary embodiment includes a transmission matching section 110, a controller 120, a switching section 130, and a converter 150.

The transmission matching section 110 includes a signal detector 110a for detecting the frequency of transmission lines connected to customer-premises equipment 30b, and a transmission line detector 110b for detecting the number of transmission lines.

The signal detector 110a detects the maximum frequency of signals that can be transferred through the transmission lines connected to the customer-premises equipment 30b, and detects the characteristics of response signals by which the status of the lines can be checked. The status of the lines refers to the status of copper wires that can affect the quality of data provided to the customer-premises equipment 30b, including the length of the transmission lines, disconnection of the transmission lines, and abnormal connection of the transmission lines. The response signal characteristics may include at least one between frequency response characteristics and signal-to-noise ratio (SNR).

The transmission line detector 110b detects the number of lines connected to the customer-premises equipment 30b by sensing impedance changes or input signals in the lines connected to the customer-premises equipment 30b.

The controller 120 determines which signal transmission mode to provide depending on the number of transmission lines detected by the transmission matching section 110. If a plurality of signal transmission modes are availabled, the controller 120 sets the signal transmission mode of the network management equipment 20 by calculating the transmission performance in each transmission mode based on the maximum frequency information and response signal characteristics detected by the transmission matching section 110.

For example, if the transmission line detected by the transmission matching section 110 is a pair of wires, the controller 120 may determine to provide the SISO mode as the signal transmission mode. And if the transmission lines detected by the transmission matching section 110 are two ore more pairs of wires, the controller 120 may determine to provide the SISO mode or the MIMO mode as the signal transmission mode.

In this case, the controller 120 may compare the transmission performance in the SISO mode and the transmission performance in the MIMO mode based on the maximum frequency information and response signal characteristics detected by the transmission matching section 110. If the transmission performance in the SISO mode is deemed better, the controller 120 may control the transmission mode to run the SISO mode. While if the transmission performance in the MIMO mode is deemed better, the controller 120 may control the transmission mode to run the MIMO mode.

The controller 120 calculates transmission performance, i.e., maximum transfer rate, based on the number of subcarriers, i.e., symbols, the number of bits transmitted per symbol, a forward error correction (FEC) rate, and a subcarrier transmission frequency.

That is, the maximum transfer rate may be calculated as in Equation 1.

In this case, the subcarrier transmission frequency may be calculated by adding a guard band frequency to frequency information calculated using the number of subcarriers and the transmission frequency bandwidth. That is, the subcarrier transmission frequency may be calculated as in Equation 2.

In this case, the number of bits transmitted per symbol and the forward error correction rate may vary with the response signal characteristics, and the transmission frequency bandwidth and the number of subcarriers may vary depending on the transmission mode.

The switching section 130 switches data transferred from the Ethernet switch 50 over a network interface, which is to be forwarded to the customer-premises equipment 30b, and passes the data to the converter 150.

The converter 150 receives transmission mode information and information about the number of transmission lines from the controller 120, and converts the data passed from the switching section 130 into data suitable for the transmission lines connected to the customer-premises equipment 30b.

The transmission mode configurating apparatus and transmission mode configurating method using the same according to an exemplary embodiment may provide optimized high-speed internet service by selecting a data transmission mode depending on the number of transmission lines connecting a network relay and customer-premises equipment, and the status of the transmission lines.

In the transmission mode configurating apparatus transmission mode configurating method using the same according to an exemplary embodiment, a network provision system may provide optimized internet service depending on the number of transmission lines connecting a network relay and customer-premises equipment, and the status of the transmission lines.

The embodiments described above are not implemented by only the apparatus and method, and may be implemented using a program for realizing a function corresponding to the configuration of the embodiment or a recording medium storing the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for configurating a transmission mode to provide an Internet service to a customer-premises equipment by a transmission mode configurating apparatus in an access network structure, wherein network management equipment and customer-premises equipment are connected through a bundle of cables including one or more transmission lines, the method comprising:
   determining a number of transmission lines connected to the customer-premises equipment by sensing impedance changes or input signals in the one or more transmission lines;
   determining, based on the number of transmission lines, one or multiple available transmission modes to provide;
   wherein if multiple available transmission modes are determined:
      calculating a transmission performance in each of the multiple available transmission modes: and
      selecting one transmission mode with the highest performance among the multiple available transmission modes,
   wherein the determining one or multiple available transmission modes comprises:
      determining a single-input and single-output (SISO) mode as the one available transmission mode when a single transmission line having a pair of wires is connected to the customer-premises equipment, and
      determining the single-input and single-output (SISO) mode and a multiple-input and multiple-output (IMO) mode as the multiple available transmission modes when multiple transmission lines having two or more pairs of wires are connected to the customer-premises equipment.

2. The method of claim 1, wherein the calculating the transmission performance comprises
   detecting the maximum frequency of signals that can be transferred through the transmission lines; and
   detecting the characteristics of response signals transferred through the transmission lines.

3. The method of claim 2, wherein the response signal characteristics comprise at least one among frequency response characteristics and a signal-to-noise ratio (SNR).

4. The method of claim 3, wherein the calculating a transmission performance comprises
   calculating the transmission performance based on the number of subcarriers, the number of bits transmitted per symbol, a forward error correction (FEC) rate, and a subcarrier transmission frequency.

5. The method of claim 4, wherein the subcarrier transmission frequency is calculated by adding a guard band frequency to frequency information, and
   wherein the frequency information is calculated using the number of subcarriers and the maximum frequency bandwidth.

6. A transmission mode configurating apparatus for changing a transmission mode to provide Internet service to customer-premises equipment connected to network management equipment, the transmission mode configurating apparatus comprising:
   a transmission matching circuit that determines a number of transmission lines connected to the customer-premises equipment by sensing impedance changes or input signals in the transmission lines, and detects:
      response signal characteristics of transmission lines connected to the customer-premises equipment,
      the maximum frequency of signals that can be transferred through the transmission lines, and
      the number of the transmission lines; and
   a controller that determines. based on the number of transmission lines detected by the transmission matching circuit, one or muitiple available transmission modes to provide,
   wherein if multiple transmission modes are determined, the controller controls the transmission mode to operate in an optimal transmission mode which is selected by calculating a transmission performance in each of the multiple available transmission modes,
   wherein the controller determines a single-input and single-output (SISO) mode as the one available transmission mode when a single transmission The having a pair of wires is connected to the customer-premises equipment, and determines the sinlge-input and single-output (SISO) mode and a multiple-input and multiple-output (MIMO) mode as the multiple available transmission modes when multiple transmission lines having two or more pairs of wires are connected to the customer-premises equipment.

7. The transmission mode configurating apparatus of claim 6, wherein the response signal characteristics comprise at least one among frequency response characteristics and a signal-to-noise ratio (SNR).

8. The transmission mode configurating apparatus of claim 7, wherein the controller calculates the transmission performance based on the number of subcarriers, the number of bits transmitted per symbol, forward error correction (FEC) rate, and a subcarrier transmission frequency.

9. The transmission mode configurating apparatus of claim 8, wherein the subcarrier transmission frequency is calculated by adding a guard band frequency to frequency information, and
   wherein the frequency information is calculated using the number of subcarriers and the maximum frequency bandwidth.

10. A transmission mode configurating apparatus for configurating a transmission mode for transmission lines connected to customer-premises equipment, wherein the customer-premises equipment is connected to network management equipment, the transmission mode configurating apparatus comprising:
    a transmitter and receiver that transmits and receives signals to and from the customer-premises equipment;
    a memory storing a program for configurating the transmission mode; and
    a processor that executes operations implemented on the program,
    wherein the program comprises instructions for:
    detecting a number of transmission lines connected to the customer-premises equipment by sensing impedance changes or input signals in the transmission lines,
    determining one or multiple available transmission modes to provide depending on the number of transmission lines,
    wherein if multiple available transmission modes are determined, controlling the transmission mode to operate in an optimal transmission mode selected by calculating a transmission performance in each of the multiple available transmission modes,
    wherein the determining one or multiple available transmission modes comprises:
        determining a single-input and single-output (SISO) mode as the one available transmission mode when a single transmission line having a pair of wires is connected to the customer-premises equipment, and determining the single-input and single-output (SISO) mode and a multiple-input and multiple-output (MIMO) mode as the multiple available transmission modes when multiple transmission lines having two or more pairs of wires are connected to the customer-premises equipment.

11. The transmission mode configurating apparatus of claim 10, wherein the program comprises instructions for
calculating the transmission performance in each of the transmission modes by detecting the frequency response characteristics of signals applied through the transmission lines, the signal-to-noise ratio, and the maximum frequency of signals that can be transferred through the transmission lines.

12. The transmission mode configurating apparatus of claim 10, wherein the program further comprises instructions for
calculating the transmission performance based on the number of subcarriers, the number of bits transmitted per symbol, a forward error correction (FEC) rate, and a subcarrier transmission frequency.

13. The transmission mode configurating apparatus of claim 12, wherein the subcarrier transmission frequency is calculated by adding a guard band frequency to frequency information, and wherein the frequency information is calculated using the number of subcarriers and the maximum frequency bandwidth.

* * * * *

UNITED STATES PATENT AND TRADEMARK OFFICE
CERTIFICATE OF CORRECTION

| | | |
|---|---|---|
| PATENT NO. | : 11,063,813 B2 | Page 1 of 1 |
| APPLICATION NO. | : 16/309996 | |
| DATED | : July 13, 2021 | |
| INVENTOR(S) | : Kwangyeol Yoon et al. | |

It is certified that error appears in the above-identified patent and that said Letters Patent is hereby corrected as shown below:

In the Claims

In Claim 1, Column 11, Line 20, please replace "modes:" with --modes;--;

In Claim 1, Column 11, Line 32, please replace "(IMO)" with --(MIMO)--;

In Claim 6, Column 12, Line 4, please replace "determines." with --determines,--;

In Claim 6, Column 12, Line 6, please replace "muitiple" with --multiple--;

In Claim 6, Column 12, Line 15, please replace "The having" with --line having--;

In Claim 6, Column 12, Line 17, please replace "sinlge-input" with --single-input--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*